United States Patent
Cancro et al.

(10) Patent No.: US 9,400,994 B2
(45) Date of Patent: Jul. 26, 2016

(54) CUSTOMIZED IMPULSE SHELVES

(71) Applicant: Wal-Mart Stores, Inc., Bentonville, AR (US)

(72) Inventors: Richard Neil Cancro, Portland, OR (US); Joel Bennett Acker, Jr., Brush Prairie, WA (US); Douglas James Pedley, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/753,439

(22) Filed: Jan. 29, 2013

(65) Prior Publication Data

US 2014/0214562 A1 Jul. 31, 2014

(51) Int. Cl.
*G06Q 30/06* (2012.01)
(52) U.S. Cl.
CPC .................................. *G06Q 30/0631* (2013.01)
(58) Field of Classification Search
None
See application file for complete search history.

(56) References Cited

U.S. PATENT DOCUMENTS

| | | | |
|---|---|---|---|
| 5,649,114 A | 7/1997 | Deaton | |
| 5,918,211 A | 6/1999 | Sloane | |
| 6,641,037 B2 | 11/2003 | Williams | |
| 6,837,436 B2 | 1/2005 | Swartz | |
| 7,246,083 B2 | 7/2007 | Bibelnieks | |
| 7,694,878 B2 | 4/2010 | Johnson | |
| RE41,717 E | 9/2010 | Dejaeger | |
| 2005/0038718 A1* | 2/2005 | Barnes | G06Q 10/087 705/28 |
| 2005/0234769 A1* | 10/2005 | Jain et al. | 705/14 |

* cited by examiner

*Primary Examiner* — Shay S Glass
(74) *Attorney, Agent, or Firm* — Howard & Howard Attorneys PLLC

(57) ABSTRACT

A method for providing an item suggested by a retailer to a user prior to an upcoming transaction at a point of sale terminal includes detecting a presence of the user at an item impulse device in a facility of retailer, wherein the item impulse device is located proximate to the point of sale terminal. When the presence of the user is detected at the item impulse device and prior to the upcoming transaction a purchase history of the user and one or more items the user currently possesses are obtained. The item suggested the retailer for the user to purchase is determined based on at least one of the purchase history and the one or more items the user currently possesses. A notification indicating the item suggested by the retailer is generated and provided to the user.

20 Claims, 7 Drawing Sheets

CUSTOMIZED IMPULSE SHELVES

BACKGROUND INFORMATION

1. Field of the Disclosure

The present invention relates generally to systems and methods for determining an item suggested by a retailer for a user to purchase prior to an upcoming transaction at point of sale terminal. In particular, examples of the present invention are related to techniques for generating a notification indicating an item suggested by a retailer for a user to purchase based on at least one of a purchase history of the user and one or more items the user currently possesses.

2. Background

Point of sale terminals in shopping facilities can include self-checkout devices and facility attendant-operated checkout devices. Proximate to such point of sale terminals is a designated area where customers wait in line to conduct transactions at the point of sale terminals. This area is generally known as the checkout lane.

Shopping facilities often include impulse shelves in the checkout lane often stocking a plurality of products offered by the shopping facility for a customer to obtain and purchase during an upcoming transaction at the point of sale terminal. The plurality of stocked products at the impulse shelves often include products such as candy, snacks, batteries, magazines/circulars, and soft drinks to grab a customers attention for making an impulse purchase at the upcoming transaction. Hence, the plurality of stocked products are selected to appeal to any and all customers waiting in the check-out lane.

One drawback of simply stocking products on impulse shelves in the checkout lane is that much of the retail space includes products entirely undesirable to some customers, and thus retail space is wasted on those those customers. For instance, impulse shelves including a plurality of candy bars stocked would be wasted on a customer that is Diabetic because that customer would generally never be purchasing candy. Another drawback of impulse shelves is that there is no way of stocking products tailored toward each potential customer waiting in the checkout lane.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
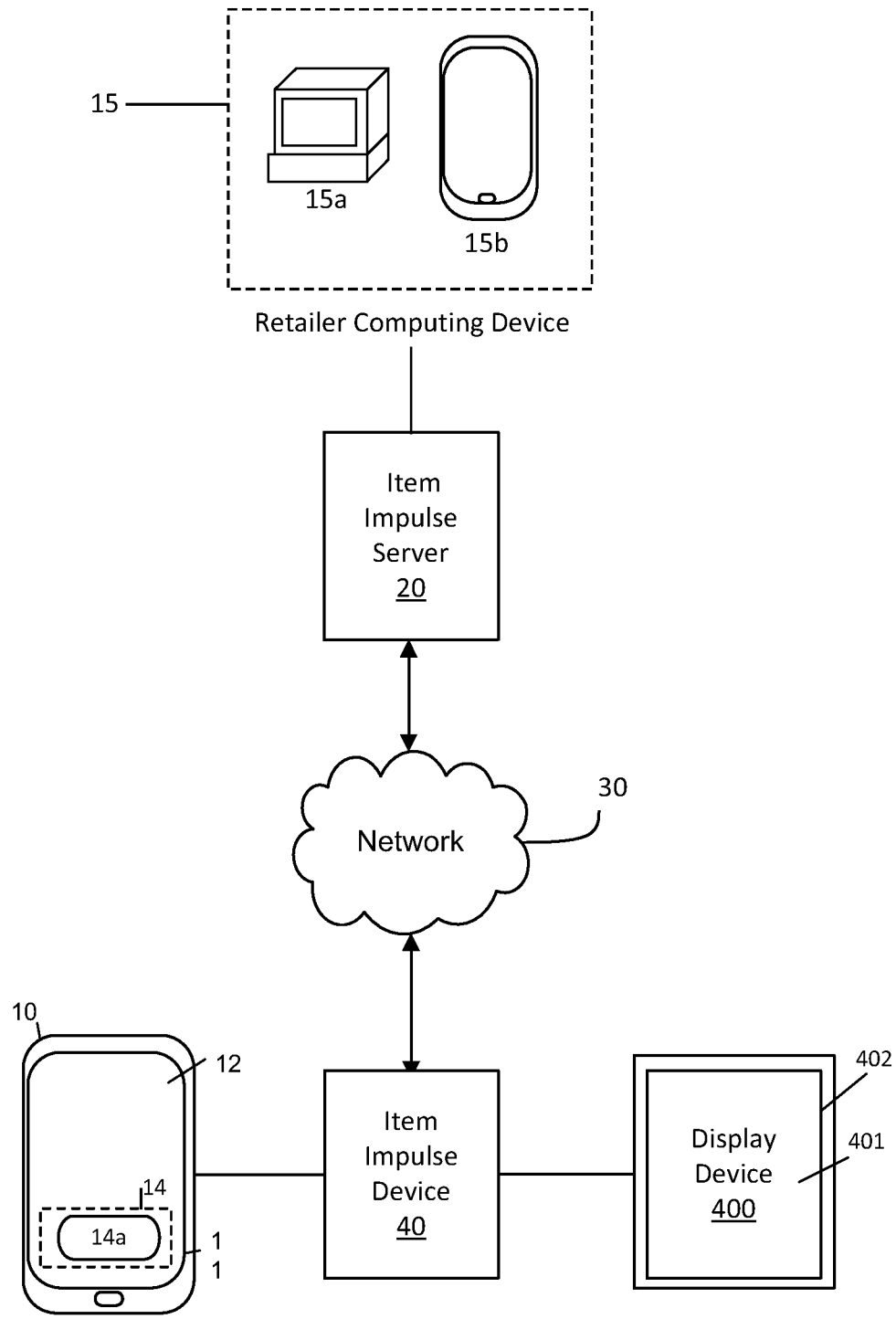
FIG. 1 schematically illustrates an item impulse server in communication with and item impulse device and a mobile computing device displaying a graphical user interface in accordance with an exemplary embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. Techniques for generating a notification indicating an item suggested by a retailer for a user to purchase when a presence of the user is detected at an item impulse device are described herein. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

It may be desirable to notify users of suggested items being offered by a retailer within a facility of the retailer prior to an upcoming transaction at a point of sale terminal. Notifying users of an item suggested by the retailer for the user to purchase at a most relevant time, e.g., when the user is waiting in line at a checkout lane prior to an upcoming transaction, are described herein. Accordingly, an item impulse device may be present at each checkout lane to notify the user of the item suggested by the retailer and allow the user to obtain the item prior to the upcoming transaction at the point of sale terminal. The term "facility" can refer to shopping venues, complexes and department stores; the term "user" can refer to a potential consumer, customer or shopper at the facility; the term "product" can refer to groceries, foods, office supplies, clothing wares, or any other fungible goods sold by the retailer; the term "item" can refer to any type of indicator of a product sold by a retailer; the term "point of sale terminal" can refer to a self checkout device or a checkout device operated by a facility attendant, e.g., a cash register; and the term "item impulse device" can include a shelf apparatus or a vending machine capable of dispensing or providing products to a user based on at least one of a purchase history of the user and one or more items the user currently possesses prior to the upcoming transaction at the point of sale terminal.

Retailers may allow a user to create a user identifier corresponding to the user, wherein user information corresponding to the user can be accessed by the retailer when the user presents the user identifier. The user information can be used by the retailer to improve the shopping experience for the user. The retailer may furnish a loyalty card or tag for the user that includes the user identifier. The user may present the loyalty card or tag at various devices furnished by the retailer within facilities of the retailer. In an exemplary embodiment, a presence of a user may be detected at an item impulse device when a user presents his/her loyalty card or tag to the item impulse device, wherein the item impulse device is located proximate to a point of sale terminal. For instance, the loyalty card may include a near field communication (NFC) chip or a radio frequency identification chip (RFID) that is received by a reader of the item impulse device when the loyalty card or tag is within a proximity of the item impulse device. Likewise, the loyalty card or tag may include a magnetic strip that is read by the item impulse device when the user scans the loyalty card or tag at a scanning device of the item impulse device.

Additionally, the item impulse device may be equipped with a display device to present and display generated notifications for view by the user while the user is at the item impulse device and waiting in the checkout lane prior to an upcoming transaction at the point of sale terminal. The user can input a command causing the display device to perform one or more operations relating to the generated notification. As used herein, the term "display device" can refer to any display monitor, screen, touch screen, interface or other device capable of displaying information, including a digital LCD or LED screen.

Some users utilize the capabilities of their mobile computing devices to obtain and view information. For example, a user may obtain a generated notification from an item impulse server of the retailer when the presence of the mobile computing device is detected at the item impulse device. For instance, the presence of the mobile computing device at the item impulse device may be detected when the mobile computing device has connected to a communication device of the item impulse device using Bluetooth or other communications. In one embodiment, a user identifier corresponding to the user is transmitted from the mobile computing device to the item impulse device upon connection. As used herein, the term "mobile computing device" can refer to mobile telephones, laptop computers, and tablet computers. Similar to the display device, generated notifications can additionally or alternatively be displayed by the mobile computing device for view by the user while the user is at the item impulse device and waiting in the checkout lane prior to an upcoming transaction at the point of sale terminal. The user can input a command causing the mobile computing device to perform one or more operations relating to the generated notification.

In accordance with various embodiments of the present disclosure, techniques are described for obtaining a purchase history of a user being indicative of products previously purchased by the user. As used herein, the term "purchased item" can refer to a purchased product previously bought by a user from the retailer. Further, the term "purchase history" can refer to a list of purchased items. The purchase history may be obtained when the item impulse server receives a user identifier corresponding to the user broadcasted from the item impulse device. The purchase history may be retrieved by the item impulse server from a user database using the user identifier.

Furthermore, techniques are described for obtaining one or more items a user currently possesses that each indicate a different product that the user intends to purchase during the upcoming transaction at the point of sale terminal. The one or more items the user currently possesses may be obtained using one or more RFID labels each corresponding to respective ones of the products the user intends to purchase. For instance, each product contained in a shopping cart of a user while waiting in a checkout lane may have a respective RFID label attached to the product that is capable of being read by an RFID reader of the item impulse device. Thereafter, the item impulse device may transmit an item identifier using each RFID label to an item impulse server to indicate respective ones of the one or more products the user intends to purchase. In another instance, each respective RFID label may be obtained by a mobile computing device corresponding to the user when the mobile computing device includes a communication device, e.g., RFID reader or NFC reader, equipped to receive information from RFID labels. In this instance, the mobile computing device may read each RFID label upon tapping the mobile computing device to the corresponding product. Thereafter, the mobile computing device may transmit the one or more item identifiers to the item impulse device using the one or more obtained RFID labels. Embodiments are further envisioned where each product includes a universal product code (UPC) capable of being scanned by the item impulse device and/or mobile computing device to obtain the item identifiers corresponding to the items the user currently possesses.

Techniques are further described for determining an item suggested by the retailer for the user to purchase based on at least one of the purchase history of the user and the one or more items the user currently possesses. The user may request to have the item impulse device dispense a product indicative of the item suggested by the retailer if the product is stocked at the item impulse device or the user may request to have a facility attendant retrieve the product and bring it to the user while the user waits in the checkout lane. Embodiments are further envisioned where the user may request a voucher be printed from the item impulse device, wherein the voucher can be presented at the point of sale terminal to purchase the product while the product is subsequently brought to the user upon completing the transaction. The item suggested by the retailer may be determined at a processing device of an item impulse server furnished by the facility. In one embodiment, the item suggested by the retailer may be indicative of a preferred product identified as previously purchased by the user from the purchase history that is not indicative of the one or more items the user currently possesses. For instance, a user may buy eggs every week and the item impulse device in the checkout lane may determine that the user does not currently intend to purchase eggs at an upcoming transaction. Accordingly, a notification can be provided to the user indicating that the user may have forgotten eggs this week and provide the user with the eggs while the user waits in the checkout lane. In another embodiment, the item suggested by the retailer may be indicative of an explicitly preferred product by the user obtained from user preferences provided by the user that is not indicative of the one or more items the user currently possesses. In yet another embodiment, the item suggested by the retailer may correspond to a recurring item. For instance, the processing device may query a plurality of purchase histories corresponding to a plurality of users from a user database using one or more item identifiers each corresponding to respective ones of the one or more items the user currently possesses. Thereafter, the processing device may retrieve the recurring item form the plurality of purchase histories that is frequently purchased together with at least one of the one or more items the user currently possesses. For instance, the processing device can determine that a user intends to purchase a flashlight and thereafter generate a notification suggesting to the user that batteries are frequently purchased together with the flashlight. The user may accordingly request to retrieve the batteries for purchase at an upcoming transaction at a point of sale terminal.

FIG. 1 illustrates an item impulse server 20 in communication with an item impulse device 40, a mobile computing device 10 and a retailer computing device 15. The retailer computing device 15 can include a stationary computing device 15a corresponding to a specific section of the facility, e.g., a stockroom or a point of sale terminal, or a mobile computing device 15b corresponding to a facility attendant. While one item impulse server 20 is illustrated, the term "item impulse server" refers to one or more servers that operate in an individual or distributed manner. For instance, each item impulse device 40 may include a respective "item impulse server" or one "item impulse server" may operate a plurality of item impulse devices. While one retailer computing device 15 is illustrated, the term "retailer computing device" refers to one or more computing devices that operate to transmit one or more inputs to the item impulse server 20 corresponding to a plurality of users at a point of sale, wherein the item impulse server 20 can determine a purchase history of a user based on a collection of electronic receipts corresponding to the user. The retailer may additionally use the retailer computing device 15 to input notifications indicating an item suggested by the retailer.

The item impulse server 20 may include a processing device that detects a presence of the user at the item impulse device 40 and prior to the upcoming transaction. When the presence of the user is detected at the item impulse device 40, the processing device may obtain a purchase history of the user and one or more items the user currently possesses, determine the item suggested by the retailer for the user to purchase based on at least one of the purchase history and the one or more items the user currently possesses, generate a notification indicating the item suggested by the retailer and provide the generated notification to the user. The notification can be provided to the user by transmitting the notification from the processing device to the item impulse device 40, wherein the notification can be displayed upon at least one of a display device 400 or a mobile computing device 10 corresponding to the user. The item impulse device 40 is equipped with the display device 400. The display device 400 is displaying a graphical user interface (GUI) 401 on a touch screen 402 of the display device 400. The GUI 401 may display operational inputs that allow the user to provide a command to the item impulse device 40, the command causing the item impulse device to perform one or more operations. In the illustrated example, the mobile computing device 10 is displaying a graphical user interface (GUI) 12 on a touch screen 11 of the mobile computing device 10. The graphical user interface may display at least one operational input 14, e.g., push button 14a, that allows the user to provide a command to the item impulse device 40, the command causing the item impulse device 40 to perform one or more operations. Hence, the user may provide the command to item impulse device 40 using either of the GUI 401 of the display device 400 or the GUI 12 of the mobile computing device 10.

Figure 2:
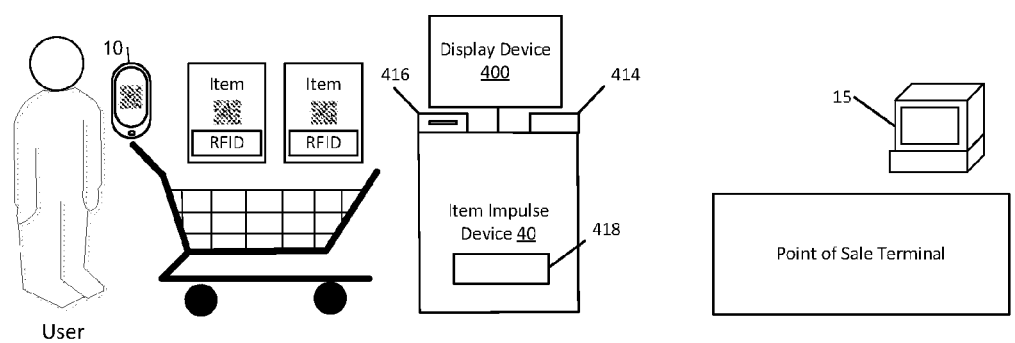
FIG. 2 schematically illustrates a non-limiting example of a facility checkout lane including the item impulse device of FIG. 1 and a point of sale terminal, in accordance with an exemplary embodiment of the present disclosure.

FIG. 2 schematically illustrates a non-limiting example a presence of a user detected at the item impulse device of FIG. 1, in accordance with an exemplary embodiment, the of the present disclosure. The illustrated example includes the item impulse device 40 located proximate to a point of sale terminal, e.g., the item impulse device 40 is located in a checkout lane while a user waits to conduct a transaction at the point of sale terminal. The item impulse device 40 equipped with the display device 400 further includes an RFID reader 414, a communications device 416 and a product dispenser 418.

In the illustrated non-limiting example, the user is equipped with a mobile computing device 10 and currently possesses items 1 and 2 in a shopping cart. The presence of the user may be detected when the mobile computing device 10 connects to the item impulse device via the communications device 416. Alternatively, the user may present a user identifier using a loyalty card or tag that may be read by the communications device 416 when the loyalty card or tag is equipped with a NFC or RFID chip. Similarly, the communications device 416 may be configured to scan the loyalty card or tag when the loyalty card or tag includes magnetic strip. The items 1 and 2 that the user currently possesses each indicate a different product that the user intends to purchase during the upcoming transaction at the point of sale terminal. Each item may be identified by a corresponding item identifier using an RFID label corresponding to each product that may be received by the RFID reader 414. Alternatively, each RFID label may be obtained by the mobile computing device 10 when the mobile computing device includes a communication device, e.g., RFID reader or NFC reader, equipped to receive information from RFID labels. Accordingly, a notification indicative of an item suggested by the retailer for the user to purchase may be provided from the item impulse server 20 to the user via displaying the notification upon either one of the display device 400 or the mobile computing device 10 using the item impulse device 40. In one embodiment, a product indicative of the suggested item may be dispensed via the product dispenser 418 or a facility attendant may be notified to retrieve the product and provide the product to the user at the point of sale terminal.

FIGS. 3A-3D illustrate non-limiting examples of notifications displayed on the GUI 401 of the display device 400 or the GUI 12 of the mobile computing device 10 FIG. 1. It will be understood that the displayed notifications are not limited to any size or shape. Embodiments are envisioned where the notification can first be displayed as a smaller graphical feature such as a banner displayed on a portion of the GUI 401 or GUI 12 that can be enlarged upon a user input, e.g., tapping, to expand the size of the banner. The notification transmitted to the item impulse device 40 and displayed on either of the display device 400 or the mobile computing device 10 can be indicative of an item suggested by the retailer for the user to purchase. The notification can include an interactive notification prompting either of the display device 400 or the mobile computing device 10 to display an interactive graphic in either of the respective GUIs 401 or 12. In exemplary embodiments, the interactive graphic displays information related to at least one of a promotion offered by the retailer related to the suggested item, an indication of why the item was suggested by the retailer and an inquiry requested by the retailer. The term "inquiry" can refer to a question, query, survey or demand requested by the retailer that solicits a response from the user. The interactive graphic allows the user to provide a command to the item impulse device 40 to perform one or more operations relating to the inquiry. In one embodiment, the user can provide the command via operational input 14a of FIG. 1 including "one-tap" yes and no push buttons. Alternatively, the user may provide the command via any other operational inputs including, but not limited to, a speech input, gesturing and shaking the display device 400 or the mobile computing device 10.

Figure 3A:
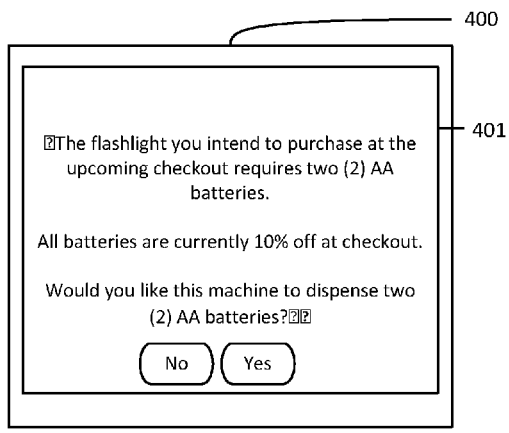
FIG. 3A-3D schematically illustrate non-limiting examples of generated notifications displayed on a graphical user interface of the display device or the mobile computing device of FIG. 1.
Figure 3B:
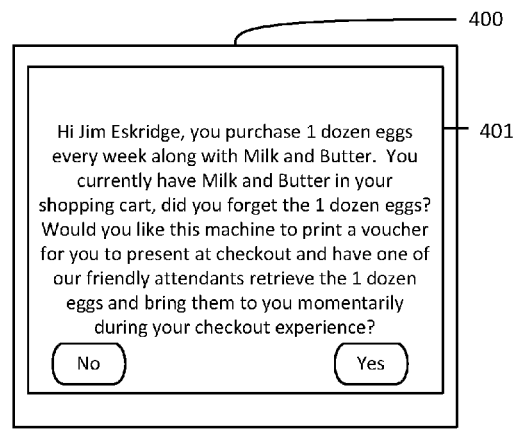

FIG. 3A illustrates a non-limiting example of a notification being indicative of a promotion offered by the retailer related to the item suggested by the retailer, an indication of why the item was suggested by the retailer and an inquiry requested by the retailer. For instance, two (2) AA batteries may be identified as the suggested item due to the fact that the user intends to purchase a flashlight that requires the use of two (2) AA batteries. The retailer may offer the batteries at a discount. The user may then input a command to the GUI 401 that causes the item impulse device 40 of FIG. 1 to dispense the batteries. FIG. 3B illustrates a non-limiting example of a notification being indicative of an indication of why an item is suggested by the retailer and an inquiry requested by the retailer. For instance, Eggs may be suggested by the retailer due to the fact that the user always purchases Eggs when the user purchases Milk and Butter, and in this instance, the user currently intends to purchase Milk and Butter during an upcoming transaction at a point of sale. The user may input a command to the GUI 401 that causes the item impulse device 40 of FIG. 1 to print a voucher for the eggs to present at the point of sale and subsequently request a facility attendant to retrieve the Eggs for the user while the user waits in the checkout line.

Figure 3C:
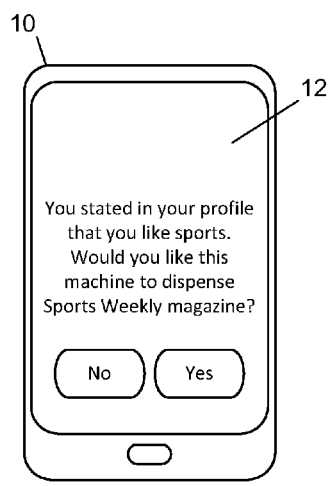
Figure 3D:

FIG. 3C illustrates a non-limiting example of a notification being indicative of an indication of why an item is suggested by the retailer and an inquiry requested by the retailer For instance, a user may provide in a user profile that is stored in a user database that the user explicitly prefers sports. The notification may be displayed upon the GUI 12 suggesting that the user may like to purchase a copy of a Sports Weekly magazine. Accordingly, the user may input a command to the GUI 12 causing the item impulse device 40 to dispense the copy of Sports Weekly magazine. FIG. 4D illustrates a non-limiting example of a notification being illustrates a non-limiting example of a notification being indicative of a promotion offered by the retailer related to the item suggested by the retailer, an indication of why the item was suggested by the retailer and an inquiry requested by the retailer. For instance, a new Twilight book may be suggested based on a user's purchase history indicating that the user previously purchased a previous Twilight book. The retailer may allow the user to purchase the book and have the book delivered to a residence of the user, the residence provided by the user in a user profile stored in the user database. Accordingly, the user may input a command to the GUI 12 causing the item impulse device 40 to purchase the book for the user and have the Twilight book delivered to the user's residence. The user may be charged using user billing information obtained from a user database of the item impulse server using the item identifier corresponding to the user.

The examples of FIGS. 3A-3D are provided for example only and not intended to be limiting. It will be appreciated that the generated notification including the interactive notification is not limited to displaying one type of information, but each generated notification may include any combination of information related to at least one of the promotion offered by the retailer related to the suggested item, the indication of why the item was suggested by the retailer, and the inquiry requested by the retailer allowing the user to provide the command using the GUI 401 or 12 to the item impulse device 40 based on at least one of a purchase history of the user and one or more items the user currently possesses, and additionally or alternatively, a product explicitly preferred by the user. Furthermore, variations of the GUI 401 or 12 are contemplated and are within the scope of the present disclosure.

Figure 4:
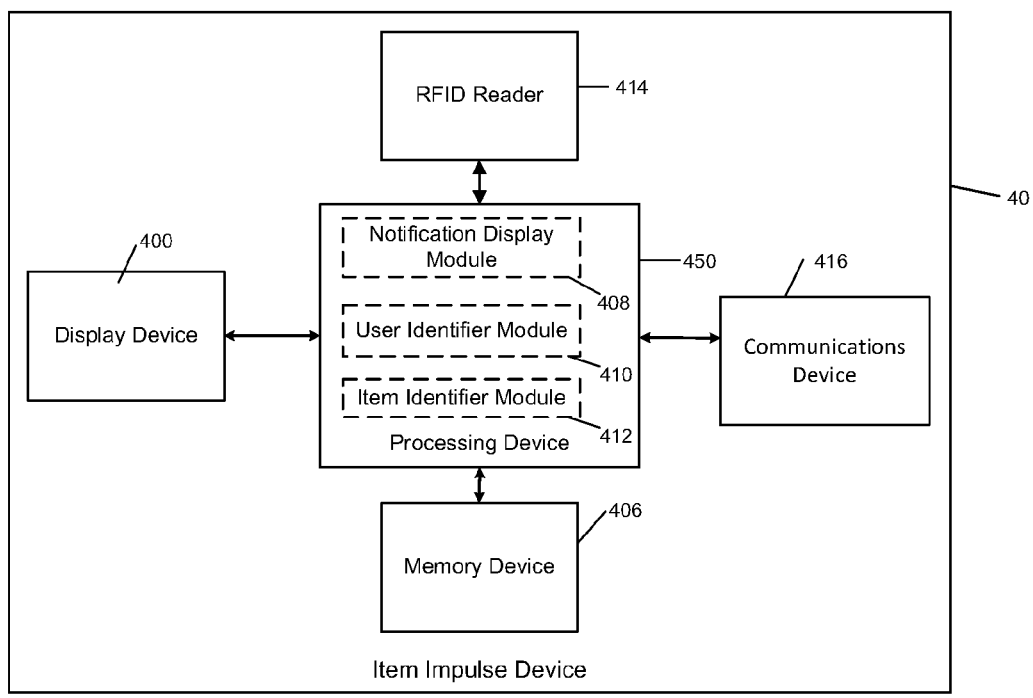
FIG. 4 is a block diagram illustrating components of the item impulse device of FIG. 1, in accordance with an exemplary embodiment of the present disclosure.

Referring now to FIG. 4, a block diagram illustrating example components of the item impulse device 40 of FIG. 1 is depicted. In the example embodiment, the item impulse device 40 includes a processing device 450, a memory device 406, an RFID reader 414, a communications device 416 and the display device 400.

The processing device can include memory, e.g., read only memory (ROM) and random access memory (RAM), storing processor-executable instructions and one or more processors that execute the processor-executable instructions. In embodiments where the processing device 450 includes two or more processors, the processors can operate in a parallel or distributed manner. The processing device 450 can execute the operating system of the display apparatus. In the illustrative embodiment, the processing device 450 also includes a notification display module 408 for displaying a notification transmitted from the item impulse server 20 of FIG. 1. The notification display module 408 may provide the interface graphic in the GUI 401 and allow the user to provide the command to the item impulse device 40 to execute one or more operations relating to the interface graphic. In the illustrative embodiment, the processing device 450 also includes a user identifier module 410 for determining at least one of the mobile computing device 10 has connected to the item impulse device 40 and a user identifier corresponding to the user is presented to the item impulse device 40. Additionally, the processing device 450 includes an item identifier module for one or more item identifiers to the item impulse server 20 of FIG. 1.

The communication device 416 is a device that allows the item impulse device 40 to communicate with another device, e.g., the item impulse server 20, via the network 30. The communication device 416 can additionally allow the item impulse device 40 to communicate with the mobile computing device 10, via Bluetooth. In one embodiment, the user may provide a command using a graphical user interface displayed upon one of the display device 400 and the mobile computing device that causes the item impulse device to perform one or more operations. The communication device 416 can include one or more wireless transceivers for performing wireless communication and/or one or more communication ports for performing wired communication. The memory device 406 is a device that stores data generated or received by the item impulse device 10. The memory device 406 can include, but is not limited to a hard disc drive, an optical disc drive, and/or a flash memory drive. The memory device 406 can include storage for monitoring notifications received at the item impulse device 40 and/or products currently stocked at the item impulse device 40.

The RFID reader 414 is a device integrated within the item impulse device that can uniquely identify products a user intends to purchase that include RFID tags. For instance, a user whose presence is detected at the item impulse device may include products in a shopping cart that the user intends to purchase, the products including RFID tags or labels read by the RFID reader 414. The identified items can be communicated to the item identifier module 412. The display monitor 400 is a device configured to display item notifications transmitted through the communications device 416.

Figure 5:
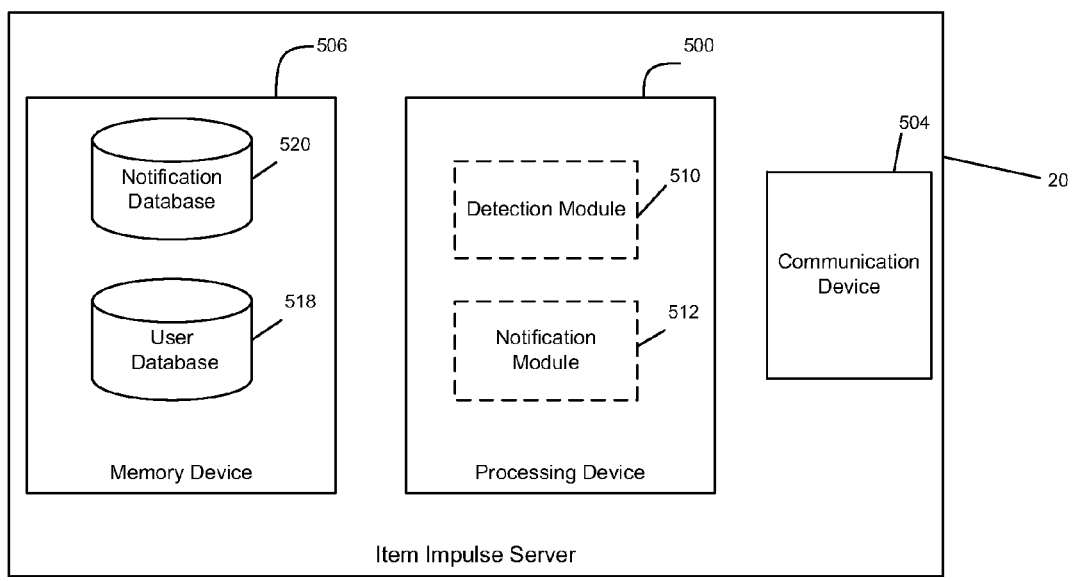
FIG. 5 is a block diagram illustrating components of the item impulse server of FIG. 1, in accordance with an exemplary embodiment of the present disclosure.

Referring now to FIG. 5, a block diagram illustrating an exemplary item impulse server 20 is depicted. In an exemplary embodiment, the item impulse server 20 includes a processing device 500, a communication device 504, and memory device 506.

The processing device 500 can include memory, e.g., read only memory (ROM) and random access memory (RAM), storing processor-executable instructions and one or more processors that execute the processor-executable instructions. In embodiments where the processing device 500 includes two or more processors, the processors can operate in a parallel or distributed manner. In the illustrative embodiment, the processing device 500 executes a detection module 510 and a notification module 512, which are described in greater detail below.

The detection module 510 detects a presence of the user at the item impulse device 40 prior to an upcoming transaction at a point of sale terminal. In one embodiment, the detection module 510 detects the presence of the user by determining that the mobile computing device 10 has connected to a facility network, via Bluetooth or other wireless communication. In another embodiment, the detection module 510 detects the presence by determining a user identifier corresponding to the user is presented by the user to the item impulse device 40. For instance, the user may possess a loyalty card or tag that includes an RFID or NFC label that broadcasts the user identifier to the item impulse device 40. Alternatively, the loyalty card or tag may include a magnetic strip that can be scanned by the item impulse device 40.

The notification module 512 obtains a purchase history of the user and one or more items the user currently possesses in response to the presence of the user detected at the item impulse device. The notification module may additionally obtain user preferences provided by the user and stored in a user database 518, the user preferences being indicative of products explicitly preferred by the user. Additionally, the notification module 512 determines an item suggested by the retailer for the user to purchase based on at least one of the purchase history, the explicitly preferred products and the one or more items the user currently possesses. The notification module 512 further generates a notification indicating the item suggested by the retailer. The generated notification may include any combination of information related to at least one of a promotion offered by the retailer related to the suggested item, an indication of why the item was suggested by the retailer, and an inquiry requested by the retailer discussed above in the non-limiting examples provided in FIGS. 3A-3B. The notification module 512 subsequently transmits the generated notification to the item impulse device 40 for display upon one of a graphical user interface displayed upon one of the display device 400 and the mobile computing device 10.

The communication device 504 is a device that allows the item impulse server 20 to communicate with another device, e.g., the item impulse device 40, via the network 30. The communication device 504 can include one or more wireless transceivers for performing wireless communication and/or one or more communication ports for performing wired communication.

The memory device 506 is a device that stores data generated or received by the item impulse server 20. The memory device 506 can include, but is not limited to, a hard disc drive, an optical disc drive, and/or flash memory drive. Further, the memory device 506 may be distributed and located at multiple locations. The memory device 506 is accessible to the processing device 500.

A notification database 520, or similar structure, can be stored in the memory device 506. In an exemplary embodiment, a retailer maintains the notification database 520 to input and store notifications. For instance, a facility manager may input notifications indicating information such as current promotions relating to products for storage in the notification database 520 via the retailer computing device 15 of FIG. 1. The notification module 512 retrieves a notification stored in the notification database 508 for generating a notification. Non-limiting examples of notifications stored in the notification database 308 are illustrated in FIGS. 3A-3D above.

Additionally, a user database 518, or similar structure, can be stored in the memory device 506. In an exemplary embodiment, the retailer maintains the user database 518 to store user information for a plurality of users. The user information can include user preferences of the user being indicative of products explicitly preferred by the user and a purchase history of the user being indicative of products previously purchased by the user. The notification module 512 retrieves the user information from the user database 518 using a user identifier, e.g. a user name, provided by the user using a loyalty card or tag corresponding to the user or from the mobile computing device 10 of FIG. 1. The notification module 512 can thereby retrieve a notification stored in the notification database 520 based on the user information for generating a notification. In an exemplary embodiment, the retailer maintains the item impulse server 20, such that the user information stored in the user database 518 and the notifications stored in the notification database 520 can be retrieved by the notification module 512 to transmit a generated notification to the item impulse device 40 for display upon either of the display device 400 or the mobile computing device 10. Alternatively, a third party or a party affiliated with the retailer, can maintain the item impulse server 20.

Figure 6:
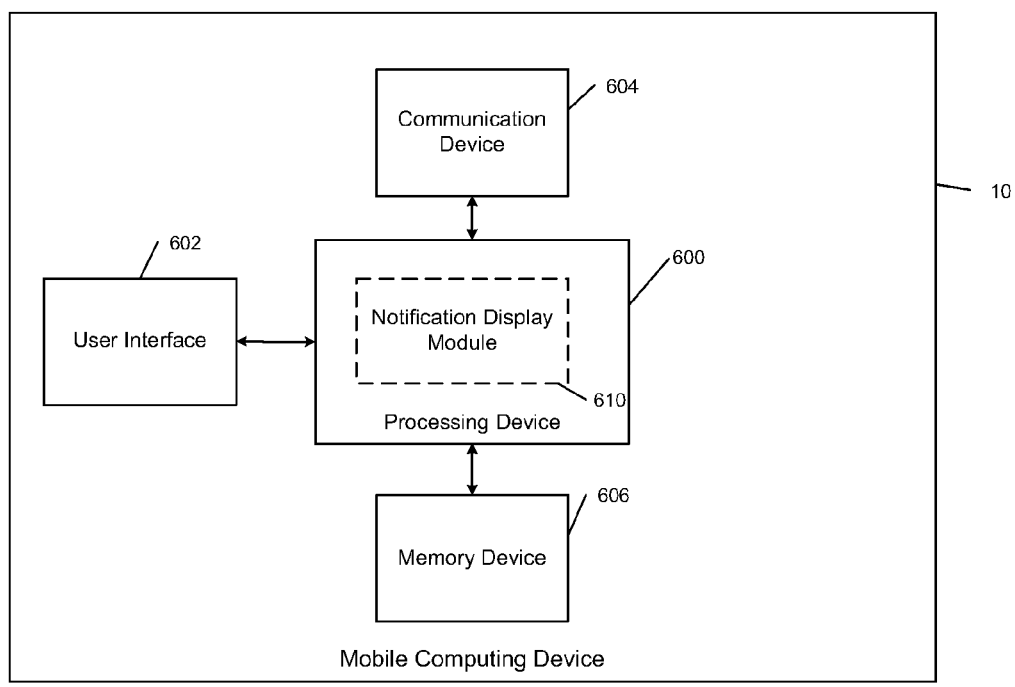
FIG. 6 is a block diagram illustrating components of the mobile computing device of FIG. 1, in accordance with an exemplary embodiment of the present disclosure.

Referring now to FIG. 6, a block diagram illustrating example components of the mobile computing device 10 of FIG. 1 is depicted. In the example embodiment, the mobile computing device 10 includes a processing device 600, a user interface 602, a communication device 604 and a memory device 606.

The processing device 600 can include memory, e.g., read only memory (ROM) and random access memory (RAM), storing processor-executable instructions and one or more processors that execute the processor-executable instructions. In embodiments where the processing device 600 includes two or more processors, the processors can operate in a parallel or distributed manner. The processing device 600 can execute the operating system of the computing device. In the illustrative embodiment, the processing device 600 also includes a notification display module 610 for displaying a notification transmitted from the item impulse server 20 and through the item impulse device 40 of FIG. 1. The notification display module 610 may provide the interface graphic in the GUI 10 and allow the user to provide the command to the mobile computing device to execute one or more operations relating to the interface graphic.

The user interface 602 is a device that allows a user to interact with the computing device 10. While one user interface 602 is shown, the term "user interface" can include, but is not limited to, a touch screen, a physical keyboard, a mouse, a microphone, and/or a speaker. The communication device 604 is a device that allows the mobile computing device 10 to communicate with another device, e.g., the item impulse device 40. The communication device 604 can include one or more wireless transceivers for performing wireless communication and/or one or more communication ports for performing wired communication. The memory device 606 is a device that stores data generated or received by the computing device 10. The memory device 106 can include, but is not limited to a hard disc drive, an optical disc drive, and/or a flash memory drive.

Figure 7:
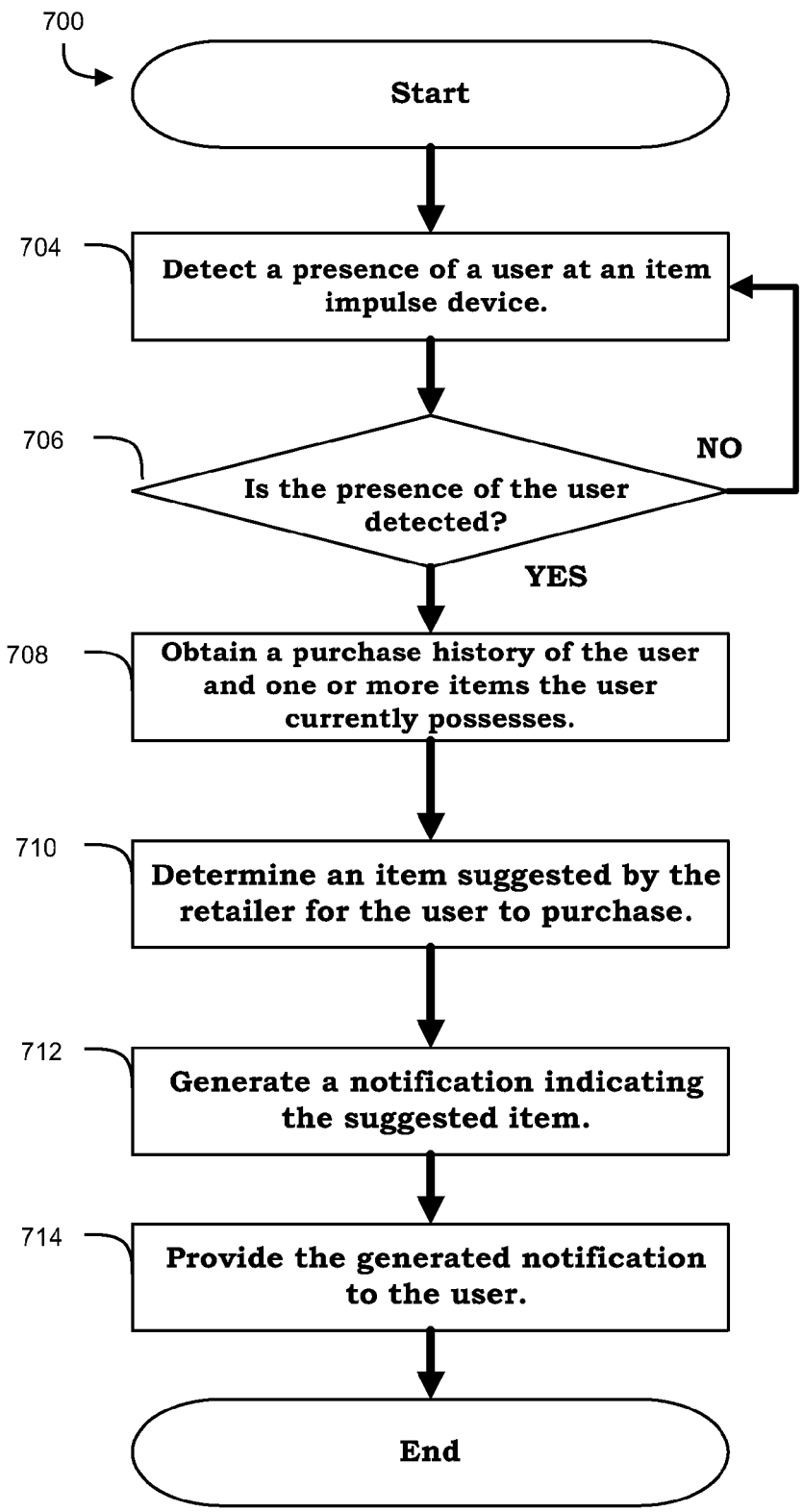
FIG. 7 is a flowchart illustrating an example method for generating a notification, in accordance an exemplary embodiment of the present disclosure.

FIG. 7 illustrates an example method of a flowchart 600 that can be executed by the item impulse server 20 for providing an item suggested by a retailer to a user prior to an upcoming transaction at a point of sale terminal. At operation 704, the detection module 510 detects the presence of the user at the item impulse device 40. At operation 706, a decision is made on whether the presence of the user is detected. If the presence of the user is not detected, the flowchart 700 iteratively reverts back to operation 704. If the presence of the user is detected, the flowchart 700 iteratively proceeds to operation 708. In an exemplary embodiment, the presence of the user can be detected upon determining the mobile computing device 10 has connected to the item impulse device 40. In another exemplary embodiment, the presence of the user can be detected upon determining a user identifier corresponding to the user is presented to the item impulse device 40 by the user. For instance, the user can present a loyalty card or tag including the item identifier that can be read by the item impulse device 40.

At operation 708, the notification module 512 obtains the purchase history of the user and one or more items the user currently possesses. As aforementioned, the notification module 512 can obtain the purchase history by receiving a user identifier broadcasted from the item impulse device, e.g., via the mobile computing device 10 or the loyalty card or tag, and retrieving the purchase history of the user from the user database 518 using the user identifier. As aforementioned, the notification module 512 can obtain the one or more items by receiving one or more item identifiers broadcasted form the item impulse device 50 using one or more RFID labels each corresponding to respective ones of one or more products the user intends to purchase. For instance, the RFID labels can be obtained by the item impulse device 40 when the one or more RFID labels are within a proximity of the item impulse device 40. Additionally or alternatively, the mobile computing device 10 may obtain the RFID labels and transmit the one or more item identifiers to the item impulse device 40 using the obtained RFID labels. Further, the notification module 512 can obtain user preferences of the user indicating products explicitly preferred by the user from the user database 518 using the item identifier.

At operation 710, the notification module 512 determines the item suggested by the retailer for the user to purchase prior to the upcoming transaction at the point of sale terminal. In one embodiment, the notification module 514 can identify a preferred product previously purchased by the user from the purchase history that is not indicative of the one or more items the user currently possesses and select the preferred product as the suggested item. In another embodiment, the notification module 512 can identify that the preferred product is purchased together with an associated product during one or more previous transactions from the purchase history, wherein the associated product corresponds to one of the one or more products the user intends to purchase at the upcoming transaction. In yet another embodiment, the notification module 512 can identify an explicitly preferred product from the user preferences that is not indicative of the one or more items the user currently possesses and select the explicitly preferred product as the suggested item. Further, the notification module 512 can query a plurality of purchase histories corresponding to a plurality of users from the user database 518 using one or more item identifiers each corresponding to respective ones of the one or more items the user currently possesses and thereafter retrieve a recurring item frequently purchased together with at least one of the one or more items the user currently possesses. The suggested item can then be selected as the retrieved recurring item by the notification module 512.

At operation 712, the notification module 512 generates a notification indicating the item suggested by the retailer. The notification can be retrieved from the notification database 520. In an exemplary embodiment, a facility and/or regional manager can input notification within the notification database 520 as new promotions related to the suggested item arise. For instance, Eggs may be on sale and this promotion can be included in a generated notification indicating Eggs as the item suggested by the retailer for the user to purchase. Each generated notification may include any combination of information related to at least one of the promotion offered by the retailer related to the suggested item, the indication of why the item was suggested by the retailer, and the inquiry requested by the retailer. Non-limiting examples of notifications stored in the notification database 308 are illustrated in FIGS. 3A-3D above.

At operation 714, the notification module 714 provides the generated notification indicating the suggested item to the user. The notification is an interactive notification including an inquiry requested by the retailer that is transmitted from the notification module 512 to the item impulse device 40 for display upon one of the display device 400 and the mobile computing device 10. Thereafter, the respective GUI 401 or 12 can display an interactive graphic prompted by the interactive graphic that allows the user to provide a command using the respective GUI 401 or 12 that causes the item impulse device to perform one or more operations related to the inquiry. For instance, the user can command the item impulse device 40 to print a voucher for the user to present during the upcoming transaction at the point of sale terminal to purchase a product indicative of the suggested item. Additionally, the item impulse device 40 may dispense the product indicative of the suggested item when the user issues the command if the item impulse device 40 stocks the product. Further, the user may command the item impulse device to request a facility attendant to retrieve the product to present to the user while the user waits at the point of sale terminal. In another embodiment, the user may command the item impulse device 40 to conduct a transaction allowing the user to purchase the product prior to the upcoming transaction at the point of sale.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A method for providing an item suggested by a retailer to a customer prior to a transaction at a sales terminal, the method comprising:
   detecting, by a computer system including an item impulse server in communication with an item impulse device associated with a retailer, a customer located in a checkout location by the item impulse device proximate to the sales terminal and identifying the customer with the item impulse server based on the detection with the item impulse device, wherein the item impulse device stores one or more items for purchase;
   identifying, by the item impulse device of the computer system using an RFID while the customer is in the checkout location, one or more items currently transported by the customer;
   determining, by the item impulse server of the computer system based at least in part on the one or more items and while the customer is in the checkout location, at least one additional item from the one or more items stored in the item impulse device;
   displaying, by the item impulse server of the computer system on an electronic display of the item impulse device, the additional item to the customer while the customer is in the checkout location; and
   prompting, by the electronic display of the item impulse device, the customer to select the additional item for purchase.

2. The method of claim 1, wherein the determining further comprises selecting, by the computer system based at least in part on one or more prior purchases made by the customer, the at least one additional item.

3. The method of claim 2, wherein the selecting further comprises selecting as the at least one additional item a product purchased by the customer in the past in combination with at least one of the one or more items.

4. The method of claim 3, wherein the one or more items comprise at least one unpurchased item as yet unpurchased by the customer from the retailer.

5. The method of claim 4, wherein the at least one unpurchased item comprises an RFID.

6. The method of claim 5, wherein the identifying the one or more items comprises reading the RFID.

7. The method of claim 6, further comprising completing, by the sales terminal after the offering, a sale to the customer of the at least one unpurchased item.

8. The method of claim 7, wherein the completing further comprises completing, by the sales terminal after the offering, a sale to the customer of the at least one additional item.

9. The method of claim 8, wherein the identifying the customer comprises identifying, by the computer system, the customer using an RFID.

10. The method of claim 9, wherein the offering comprises communicating with the customer via a mobile computing device carried by the customer.

11. The method of claim 1, further comprising completing, by the sales terminal after the offering, a sale to the customer of the one or more items.

12. The method of claim 11, wherein the completing further comprises completing, by the sales terminal after the offering, a sale to the customer of the at least one additional item.

13. The method of claim 1, wherein the identifying the customer comprises identifying, by the computer system, the human customer using an RFID.

14. The method of claim 1, wherein the offering comprises communicating with the human customer via a mobile computing device carried by the customer.

15. The method of claim 1, wherein the offering comprises communicating with the customer via an electronic display screen positioned proximate the checkout location.

16. The method of claim 1, further comprising printing, by the computer system at the checkout location after the offering, a voucher for an instance of the at least one additional item.

17. The method of claim 1, further comprising requesting, by the computer system, an associate of the retailer to retrieve an instance of the at least one additional item.

18. An apparatus comprising:
   an item impulse device proximate to a sales terminal of a retailer and storing one or more items for purchase, the item impulse device configured to:
      detect a customer located in the checkout location, and
      identify the customer and one or more items currently transported by the customer using RFID;
   a computerized server communicatively coupled to the item impulse device, the computerized server including a processing device, the processing device further configured to perform operations comprising:

determining at least one additional item from the one or more items stored in the item impulse device based at least in part on the one or more items and while the customer is in the checkout location, displaying, on an electronic display of the item impulse device, the additional item to the customer while the customer is in the checkout location, and prompting the customer to select the additional item for purchase; and the item impulse device further configured to dispense the selected additional item for purchase by the customer.

19. The method of claim 1, further comprising dispensing, by the item impulse device, the selected additional item for purchase by the customer.

20. The apparatus of claim 19, wherein the item impulse device is further configured to dispense the selected additional item for purchase by the customer.

\* \* \* \* \*